Jan. 14, 1930.   D. C. KLAUSMEYER ET AL   1,743,460
DRIVING MECHANISM
Filed Aug. 30, 1927   2 Sheets-Sheet 1
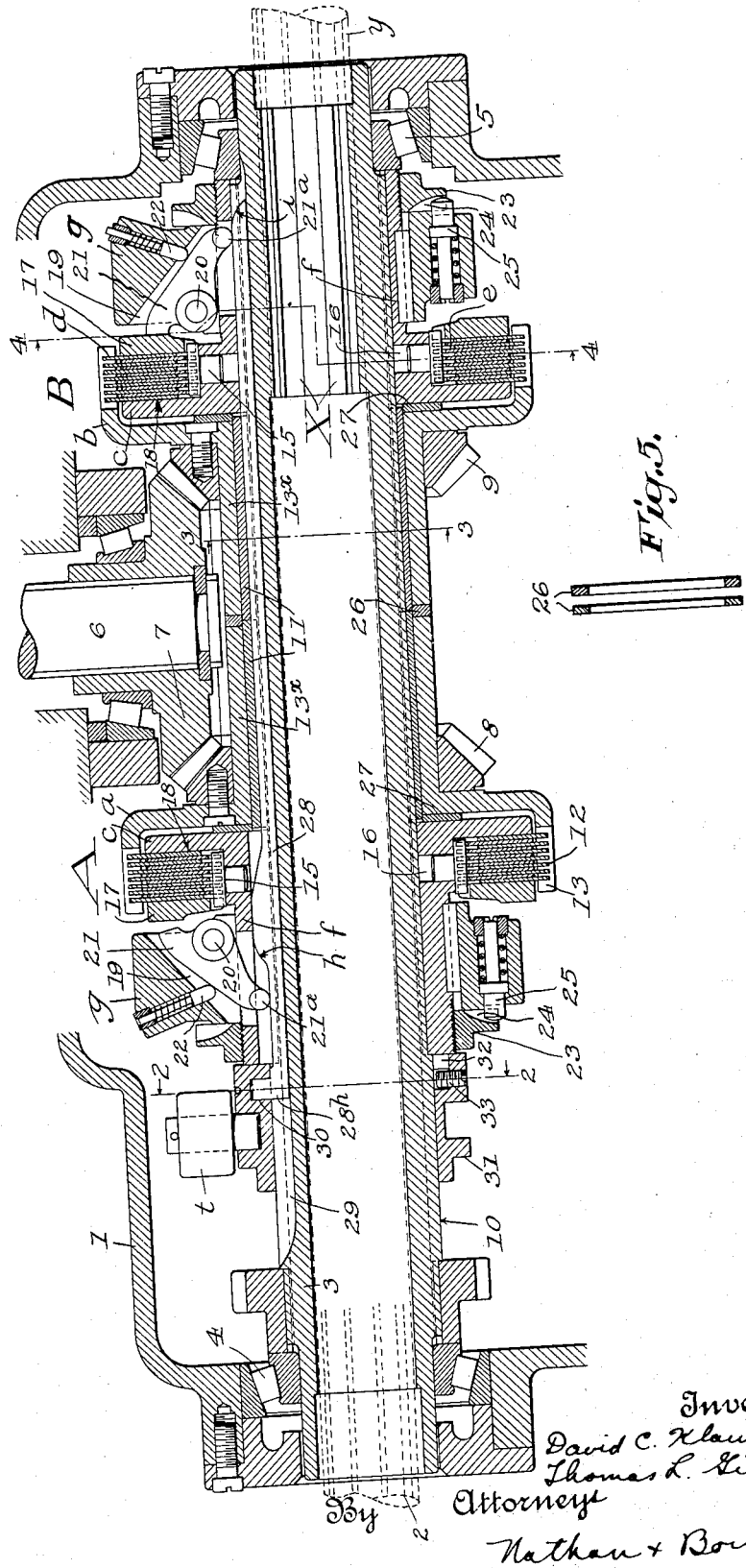

Jan. 14, 1930.  D. C. KLAUSMEYER ET AL  1,743,460

DRIVING MECHANISM

Filed Aug. 30, 1927    2 Sheets-Sheet 2

Inventors
David C. Klausmeyer
Thomas L. Gibson
By Attorneys
Nathan & Bowman

Patented Jan. 14, 1930

1,743,460

UNITED STATES PATENT OFFICE

DAVID C. KLAUSMEYER AND THOMAS L. GIBSON, OF CINCINNATI, OHIO, ASSIGNORS TO THE CINCINNATI BICKFORD TOOL COMPANY, OF CINCINNATI, OHIO, A CORPORATION OF OHIO

DRIVING MECHANISM

Application filed August 30, 1927. Serial No. 216,376.

This invention relates to reversing mechanisms of that type commonly used in machine tools for giving to a driven shaft oppositely directed rotations from a uni-directionally rotatable drive shaft.

The primary objects of the invention are to overcome certain structural defects and mechanical difficulties of prior devices of this nature, such for example as those disclosed in United States patents to Carlton No. 1,598,581 and De Roo No. 1,623,236; to provide an improved reversing mechanism which more readily, more accurately and more economically may be manufactured than said prior devices and which better may be adjusted to compensate for wear; to provide improved means for mounting and actuating the clutch devices and gears thereof; and in general, to provide a reversing mechanism better adapted to meet the exacting requirements of precision tools, (such for example as radial drills in which a drill spindle necessarily must be rotated in forward and reverse directions from a unidirectionally rotatable arm shaft) and one which will operate efficiently over great periods of time without adjustment, material wear or difficulty.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 3:
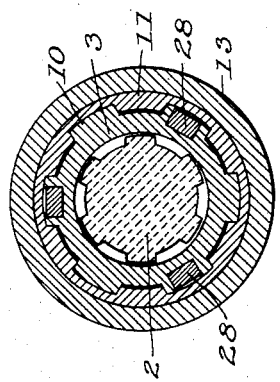
Figure 2:
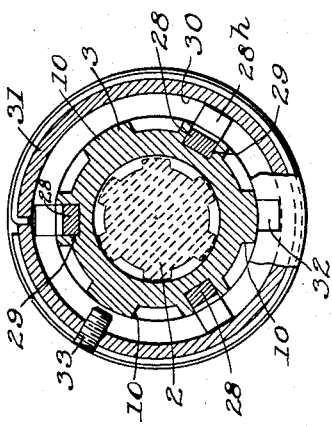
Figure 4:
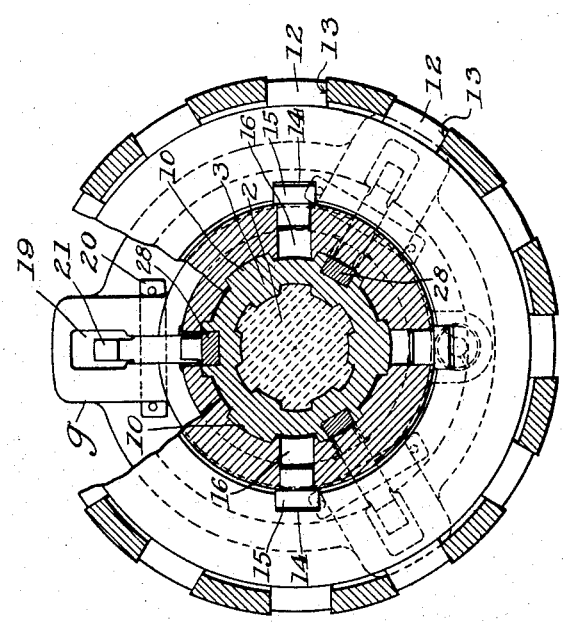

Figure 1 is a longitudinal sectional view of a reversing mechanism embodying the present invention. Fig. 2 is a transverse section on the line 2—2 of Fig. 1. Fig. 3 is a similar view on the line 3—3 of Fig. 1, Fig. 4 is a transverse section on the line 4—4 of Fig. 1 looking in the direction indicated by the arrows. Fig. 5 is a detailed view of alternate spacer members later to be referred to.

Referring more specifically to the drawings the invention is disclosed as embodied in a reversing mechanism comprising a frame or casing 1 which, when the invention is embodied in a radial drill, may be a portion of the translatable drill head. Extending through the casing 1 is a shaft 2 having a splined connection with a sleeve 3 rotatably journaled in anti-friction bearings 4 and 5 supported by the frame 1. A second shaft 6 also is journaled within the casing 1 and carries a bevel gear 7 permanently in mesh with similar gears 8 and 9 rotatably journaled coaxial with the sleeve 3, as later will be described. Clutch devices, designated generally as A and B are associated with the gears 8 and 9 respectively and serve to lock said gears to the sleeve, selectively to establish a driving connection between the shafts 2 and 6 through the sleeve 3, gear 7 and either gear 8 or gear 9. It is to be understood that power may flow through the reversing mechanism in either direction, or in other words either the shaft 2 or the shaft 6 may be the drive shaft, but for convenience the shaft 2 will hereinafter be referred to as the drive shaft and the shaft 6 as the driven shaft. The shaft 2 corresponds to the arm shaft of a radial drill and the shaft 6 to the shaft which, through suitable change gears rotates the drill spindle.

One feature of this invention resides in an improved driving connection between the sleeve 3 and the shaft 2. In devices of this nature the sleeve necessarily is of considerable length and heretofore it has been the practice either to provide a spline connection between the shaft and sleeve the entire length of the sleeve as in the De Roo patent or to spline the two together substantially midway between the ends of the spindles as shown in the Carlton patent. The full length spline connection is not essential for efficient operation and furthermore it is difficult and costly to manufacture. The mid-way spline, such as shown in the Carlton patent, also is difficult and costly to manufacture accurately, due to its location. In accordance with this invention we propose to form the splines within one end only of the sleeve as shown at X in Fig. 1. Preferably this spline connection will be at the end of the sleeve nearest the point at which the shaft 2 receives its power from a prime-mover when said shaft is the driver and at the end of the sleeve nearest the point where power is taken from the shaft 2 when power is flowing through the device in the opposite direction and the shaft 6 is the driver. This specific location of the spline connection not only greatly facilitates manufacture but it also adds to the rigidity of the structure inasmuch as it reduces the distance between the points at which power is received in the shaft 2 and delivered therefrom, thereby proportionately reducing the twisting action therein due to torque. In Fig. 1 $y$ represents the end of the shaft 2 to which power is applied by a prime mover and also from which power may be taken dependent upon which way the power is flowing through the device. The exterior surface of the sleeve 3 is provided with a plurality of splines 10 and inasmuch as various elements must be secured to the sleeve at various points these splines preferably extend the entire length of the sleeve between the bearings 4 and 5. This also facilitates manufacture.

Upon the sleeve 3 intermediate the clutches A and B there is mounted a bushing 11 having a cylindrical external surface upon which are rotatably journaled inwardly extending sleeve portions $13^x$ forming parts of clutch cups $a$ and $b$ respectively. The gears 8 and 9 are secured to these elements and are rotatable therewith coaxial with the sleeve 3. To provide a balanced drive between the sleeve 3 and the bushing 11 the latter is preferably formed with a splined internal bore which accurately fits the splined external surface of the sleeve. The bushing may be of a single element or, for convenience of manufacture, it may consist of two complemental portions as shown in Fig. 1.

The clutch devices A and B are similar in construction and function and therefore a detail description of one will suffice. Each of these devices comprises the clutch cup, before referred to, which for convenience may be termed the driven element, and a driving element $c$ arranged within the clutch cup. Intermediate the driving and driven elements of the clutch there are arranged two series of friction disks adapted when pressed together to effect a drive from one element to the other. One series of disks, designated generally as $d$ is provided with projecting portions 12 which enter notches 13 formed in the clutch cup. The other series $e$ is formed with notches 14 which engage the heads of studs 15 fitted within radial bores 16 in the driver $c$. A thrust ring 17 engages the outer face of the friction disks and acts in combination with the rear wall 18 of the driver to press said disks into driving contact. The driving element $c$ of the clutch is formed with cylindrical portion $f$ upon which is splined an annular member $g$ provided with slots 19 within which are pivotally mounted, as by pins 20 clutch actuating levers 21 having at one end a portion $21^a$ adapted to be acted on by suitable cam elements later to be described and having their opposite ends adapted to engage the clutch ring 17 thereby to force the friction disks into driving contact. Spring pressed plungers 22, carried by the member $g$, act upon the levers 21 normally to hold the levers 21 in retracted position whereby the clutch disks are normally maintained in non-driving relation.

Upon the cylindrical portion $f$ of the driving element $c$, and rearwardly of the member $g$, there is threaded an adjusting nut 23 which bears against said member $g$. By rotation of this nut the member $g$ and the levers 21 carried thereby may be adjusted toward the ring 17 to compensate for wear on the levers and on their actuating cams. To prevent accidental rotation of the adjusting nut 23 the nut is formed with a plurality of detent notches 24, two only of which are shown, which are adapted to be engaged by a spring pressed plunger 25 carried by the annular member $g$.

This invention also provides simplified and improved means for adjusting the gears 8 and 9 to compensate for wear therein. Surrounding the bushing 11 and intermediate the adjacent inner ends of the sleeves $13^x$ there is arranged a spacer member 26 which may be of any required thickness properly to mesh the gears 7—8 and 7—9. This member may be removed and replaced by a similar member of less thickness, as shown in Fig. 5, to permit the gears 8 and 9 to be adjusted toward the axis of the gear 7.

Intermediate the driving and driven elements $c$ and $a$ and $c$ and $b$ of the clutches there are arranged similar spacer members 27 which limit outward movement of the clutch cups $a$ and $b$ and their attached gears 8 and 9. It is to be observed that the ends of the bushing 11 are spaced from the driving elements $c$ sufficiently to permit axial adjustment of the parts toward the gear 7.

This invention also provides improved means for actuating the clutch devices A and B. This improved means comprises a plurality of bars 28 slidingly fitted within ways 29 formed in the sleeve 3. Each of these bars is provided with a cam surface $h$ adapted, upon lengthwise movement of the bars, in one direction, to engage the end 21ª of one of the levers 21 of the clutch A, and a cam $i$ which, upon movement in the other direction engages the end 21ª of one of the levers 21 of the clutch B. Each of the clutch actuating slide-bars is provided with an enlarged head portion 28ʰ which projects from the guideway 29. These head portions are fitted within an interior annular groove 30 formed in an annular member or spool 31 adapted to be shifted axially of the sleeve by any suitable means, such for example as that designated generally as $t$. Thus by shifting the spool 31 and the bars 28 to the left from the position shown in Fig. 1 removal of the cams $i$ from the levers 21 of the clutch B will cause clutch B to be released and thereafter engagement of the cams $h$ with the levers 21 of clutch A will cause that clutch to be rendered effective. Likewise subsequent movement of the parts to the right will similarly affect the clutches in the reverse order.

Another feature of this invention is the arrangement by means of which the clutch actuating slide bars and the spool 31 are assembled. Extending outwardly from the annular groove 30 and through the side wall of the spool 31 (as shown in Figs. 1 and 2) is a portal 32 through which the heads 28ʰ successively may be inserted, the spool being given a partial rotation after the insertion of each head to bring the portal adjacent the next head. After all of the heads have been inserted a screw 33 is threaded into a radial aperture in the spool. The inner end of this screw projects into the annular groove 30 and, upon relative rotation between the spool 31 and the sleeve contacts with the heads of either of two adjacent slide bars thereby limiting the relative rotation to less than that required to place one of the heads adjacent the filler portal. In Fig. 1 the screw 33 and the portal 32 are shown in alignment but it is to be understood that this is not essential as it might be located elsewhere for example as shown in Fig. 2.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A driving mechanism combining a rotatable driving sleeve; a driven element rotatably journaled co-axial with said sleeve; a disk clutch connected with said driven element and adapted to clutch said element to said sleeve; a member surrounding said sleeve adjacent said clutch; a plurality of clutch closing levers mounted upon said member; a plurality of bars slidingly fitted within said sleeve and each provided with a surface adapted, upon opposite movements of said bars to shift said levers alternately to close and open said clutch; and means simultaneously to shift all of said bars.

2. A driving mechanism combining a rotatable sleeve; a gear rotatably journaled co-axial with said sleeve; a multiple disk clutch connected with said gear and adapted to clutch said gear to said sleeve; a member surrounding said sleeve adjacent said clutch; a plurality of clutch closing levers mounted upon said member; a plurality of bars slidingly fitted within said sleeve and each provided with a surface adapted, upon opposite movemets of said bar, to shift said levers alternately to close and open said clutch; and an annular member slidingly mounted upon said sleeve and engaging all of said slide bars; and means to shift said annular member.

3. A driving mechanism combining a rotatable sleeve; a gear rotatably journaled co-axial with said sleeve; a multiple disk clutch connected with said gear and adapted to clutch said gear to said sleeve; a member surrounding said sleeve adjacent said clutch; a plurality of clutch closing levers pivotally mounted upon said member; yielding means normally tending to hold said levers retracted thereby to maintain said clutch released; a plurality of bars slidingly fitted within said sleeve and each provided with a cam surface adapted upon one movement of said bars, to shift said levers to close said clutch; means to shift said bars; and means to adjust said member and the levers carried thereby, axially of said sleeve to compensate for wear in the parts.

4. A driving mechanism combining a rotatable driving sleeve; a driven element rotatably journaled co-axial with said sleeve; a clutch device connected with said driven element and adapted to clutch it to said sleeve; a plurality of pivotally mounted levers adjacent said clutch and adapted, upon movement, to actuate said clutch; a plurality of bars slidingly fitted within said sleeve and each having a portion adapted to actuate a lever of said clutch device, each of said bars being formed with an enlarged head portion; an annular member slidingly mounted upon said sleeve and formed with an internal annular groove adapted to receive the head portions of said bars, said annular member also being provided with a portal to admit said head portions into said groove; and means to shift said annular member, and thereby said slide bars, to actuate said clutch.

5. A driving mechanism combining a rotatable driving sleeve; a driven element rotatably journaled co-axial with said sleeve; a clutch device connected with said driven element and adapted to clutch said element to said sleeve; a plurality of pivotally mounted levers adjacent said clutch and adapted, upon actuation, to actuate said clutch; a plurality of bars slidingly fitted within said sleeve and each having a portion adapted to actuate a lever of said clutch device, each of said bars being formed with an enlarged head portion; an annular member slidingly mounted upon said sleeve and formed with an internal annular groove adapted to receive the head portions of said bars, said annular member also being provided with a portal to admit said head portions to be inserted into said groove; means, operative after said heads have been inserted, to prevent registry of any of said heads with said portal, thereby to prevent said heads from escaping from said annular groove; and means to shift said annular member, and thereby said slide bars, to actuate said clutch.

6. The combination set forth in claim 5 in which the means to prevent registry of the heads of the bars with said portal comprises a stud, carried by the annular member and extending into the annular groove between the head portions of two adjacent slide bars, thereby limiting the relative rotation between the annular member and the sleeve.

7. A driving mechanism combining a rotatable sleeve provided with a multi-splined exterior surface; a bushing splined to said sleeve intermediate its ends and provided with a cylindrical outer surface; a shaft splined within said sleeve; a friction clutch mounted co-axial with said sleeve, said clutch comprising a member splined to said sleeve, a member rotatably mounted on said bushing and means to lock said members against relative rotation; clutch actuating bars slidingly fitted within slots formed in the exterior of said sleeve and engaging the inner surface of said bushing; and means to shift said bars to actuate said clutch.

8. A reversible driving mechanism combining a casing; a sleeve rotatably journaled in bearings supported by said casing said sleeve being formed with a multi-splined exterior extending substantially the entire length of the sleeve between said bearings; a bushing splined to the intermediate portion of the sleeve; a pair of bevel gears and driven clutch elements rotatably journaled on said bushing; a third bevel gear meshing with both of the pair of bevel gears and adapted selectively to be driven in opposite directions thereby; driving clutch elements splined to said sleeve beyond the ends of said bushing; means provided between each of said driving and driven clutch elements to lock the two against relative rotation; clutch actuating slide bars splined in said sleeve and extending through both of said clutches and through said bushing; a clutch actuating spool slidably mounted on said sleeve and engaging all of said slide bars; and means to shift said spool.

In witness whereof, we have hereunto subscribed our names.

DAVID C. KLAUSMEYER.
THOMAS L. GIBSON.